(12) United States Patent
Cahill et al.

(10) Patent No.: US 7,979,405 B2
(45) Date of Patent: Jul. 12, 2011

(54) METHOD FOR AUTOMATICALLY ASSOCIATING DATA WITH A DOCUMENT BASED ON A PRESCRIBED TYPE OF THE DOCUMENT

(75) Inventors: Jason M Cahill, Woodinville, WA (US); Adrian Fanaru, Sammamish, WA (US); Dustin G Friesenhahn, Redmond, WA (US); Ethan D Gur-esh, Quebec (CA); Hai Liu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1284 days.

(21) Appl. No.: 11/035,589

(22) Filed: Jan. 14, 2005

(65) Prior Publication Data

US 2006/0161590 A1    Jul. 20, 2006

(51) Int. Cl.
*G06F 17/30* (2006.01)
*G06F 7/00* (2006.01)

(52) U.S. Cl. .................. 707/694; 707/736; 707/758

(58) Field of Classification Search .................. None
See application file for complete search history.

(56) References Cited

U.S. PATENT DOCUMENTS

| | | | |
|---|---|---|---|
| 5,742,813 A | 4/1998 | Kavanagh et al. ............... 707/8 |
| 5,794,030 A | 8/1998 | Morsi et al. ............... 707/103 R |
| 5,842,223 A | 11/1998 | Bristor ........................ 707/204 |
| 5,860,073 A | 1/1999 | Ferrel et al. |
| 5,878,415 A | 3/1999 | Olds |
| 5,893,107 A | 4/1999 | Chan et al. ................ 707/103 R |
| 5,893,913 A | 4/1999 | Brodsky et al. |
| 5,913,063 A | 6/1999 | McGurrin et al. ............. 717/109 |
| 5,920,725 A | 7/1999 | Ma et al. ..................... 717/171 |
| 5,940,834 A | 8/1999 | Pinard et al. .................. 707/102 |
| 5,956,736 A | 9/1999 | Hanson et al. ................ 715/234 |
| 6,026,408 A | 2/2000 | Srinivasan et al. ......... 707/103 R |
| 6,038,567 A | 3/2000 | Young ..................... 707/103 R |
| 6,047,289 A | 4/2000 | Thorne et al. .................. 707/10 |
| 6,094,657 A | 7/2000 | Hailpern et al. |
| 6,230,173 B1 | 5/2001 | Ferrel et al. |
| 6,272,495 B1 | 8/2001 | Hetherington ................ 707/101 |

(Continued)

FOREIGN PATENT DOCUMENTS

EP       1557757       12/2004

OTHER PUBLICATIONS

US Office Action (Final) dated Nov. 13, 2009, issued in U.S. Appl. No. 11/305,050, pp. 1-23.

(Continued)

*Primary Examiner* — Tim T. Vo
*Assistant Examiner* — Sangwoo Ahn
(74) *Attorney, Agent, or Firm* — Merchant & Gould, P.C.

(57) ABSTRACT

A system and method is provided to automatically associate type-specific information with a document of a prescribed type. The type information includes instance-specific type information that can be instantiated to each document of the prescribed type. The type information also includes generic type information that is automatically applied to all documents of the prescribed type. Such generic type information includes policies that govern, for example, the life span of the documents or who can access the documents. Instance-specific type information can be demoted to and promoted from a document of the prescribed type. Generic type information can only be demoted to a document of the prescribed type. Type information may be demoted into a document only when the document is requested.

18 Claims, 4 Drawing Sheets

U.S. PATENT DOCUMENTS

| | | |
|---|---|---|
| 6,336,211 B1 | 1/2002 | Soe .................... 717/108 |
| 6,360,230 B1 | 3/2002 | Chan et al. ............. 707/103 R |
| 6,370,542 B1 | 4/2002 | Kenyon ................ 707/103 R |
| 6,405,220 B1 | 6/2002 | Brodersen et al. ........... 707/202 |
| 6,425,016 B1 | 7/2002 | Banavar et al. |
| 6,446,077 B2 | 9/2002 | Straube et al. ........... 707/103 Y |
| 6,584,480 B1 | 6/2003 | Ferrel et al. |
| 6,591,272 B1 | 7/2003 | Williams ................ 707/102 |
| 6,601,233 B1 | 7/2003 | Underwood ............... 717/102 |
| 6,615,223 B1 | 9/2003 | Shih et al. .................. 707/201 |
| 6,754,885 B1 | 6/2004 | Dardinski et al. ........... 717/113 |
| 6,859,217 B2 | 2/2005 | Robertson et al. |
| 6,915,287 B1 | 7/2005 | Felsted et al. |
| 6,957,229 B1 | 10/2005 | Dyor ..................... 707/103 X |
| 7,072,911 B1 | 7/2006 | Doman et al. |
| 7,146,565 B2 | 12/2006 | Toyama et al. |
| 7,155,491 B1 | 12/2006 | Schultz et al. |
| 7,249,118 B2 | 7/2007 | Sandler et al. .................... 707/1 |
| 7,392,234 B2* | 6/2008 | Shaath et al. ..................... 707/1 |
| 7,607,164 B2* | 10/2009 | Vasishth et al. .................. 726/1 |
| 2001/0011287 A1 | 8/2001 | Goto et al. |
| 2002/0138513 A1 | 9/2002 | Korotney et al. |
| 2002/0143521 A1 | 10/2002 | Call .................... 704/1 |
| 2002/0174142 A1 | 11/2002 | Demers et al. |
| 2002/0184264 A1 | 12/2002 | Berg et al. |
| 2003/0014442 A1 | 1/2003 | Shiigi et al. .................. 707/513 |
| 2003/0050937 A1 | 3/2003 | Lusen et al. ............... 707/104.1 |
| 2003/0225840 A1 | 12/2003 | Glassco et al. |
| 2003/0237046 A1 | 12/2003 | Parker et al. |
| 2004/0019639 A1 | 1/2004 | E et al. .................... 709/205 |
| 2004/0073782 A1 | 4/2004 | Price et al. |
| 2004/0123234 A1 | 6/2004 | Anderson et al. |
| 2004/0205592 A1 | 10/2004 | Huang |
| 2004/0225652 A1 | 11/2004 | Duncan et al. |
| 2004/0267595 A1 | 12/2004 | Woodings et al. ................ 705/9 |
| 2005/0010580 A1 | 1/2005 | Lancefield |
| 2005/0015436 A1 | 1/2005 | Singh et al. |
| 2005/0076036 A1 | 4/2005 | Le ................... 707/100 |
| 2005/0091192 A1 | 4/2005 | Probert et al. .................... 707/1 |
| 2005/0091637 A1 | 4/2005 | Schechter et al. |
| 2005/0102324 A1 | 5/2005 | Spring et al. |
| 2005/0108225 A1 | 5/2005 | Chau |
| 2005/0114479 A1 | 5/2005 | Watson-Luke |
| 2005/0149582 A1 | 7/2005 | Wissmann et al. ........... 707/201 |
| 2006/0004820 A1* | 1/2006 | Claudatos et al. ............ 707/101 |
| 2006/0048224 A1* | 3/2006 | Duncan et al. ................. 726/22 |
| 2006/0087669 A1 | 4/2006 | Yamaguchi et al. |
| 2006/0143561 A1 | 6/2006 | Balasubramanyan et al. |
| 2006/0184507 A1 | 8/2006 | Lefferts et al. .................... 707/2 |
| 2006/0184571 A1 | 8/2006 | Liu et al. ................. 707/103 R |
| 2006/0200751 A1 | 9/2006 | Underwood et al. |

OTHER PUBLICATIONS

US Office Action dated Jan. 31, 2008, issued in U.S. Appl. No. 11/305,050, pp. 1-17.
US Office Action dated Nov. 12, 2008, issued in U.S. Appl. No. 11/305,050, pp. 1-22.
US Office Action dated May 11, 2009, issued in U.S. Appl. No. 11/305,050, pp. 1-25.
US Office Action dated May 12, 2010, issued in U.S. Appl. No. 11/305,050, pp. 1-28.
US Office Action dated Sep. 10, 2008, issued in U.S. Appl. No. 11/058,096, pp. 1-11.
US Office Action dated Jun. 4, 2007, issued in U.S. Appl. No. 11/058,096, pp. 1-10.
US Office Action (Final) dated Mar. 18, 2009, issued in U.S. Appl. No. 11/058,096, pp. 1-11.
US Office Action dated (Final) Dec. 21, 2007, issued in U.S. Appl. No. 11/058,096, pp. 1-10.
US Office Action dated (Notice of Allowance) Sep. 8, 2009, issued in U.S. Appl. No. 11/058,096, pp. 1-7.
Notice of Allowance mailed Oct. 1, 2010 in U.S. Appl. No. 11/305,050; 9 pages.
Incremental maintenance of materialized object-oriented views in MultiView: strategies and performance evaluation http://ieeexplore.ieee.org/search/wrapper.isp?arnumber=729731, 1998; 1 page.
Using object-oriented principles to optimize update propagation to materialized views http://ieeexplore.ieee.org/search/wrapper.isp?arnumber=492178, Mar. 1, 1996; 1page.
The Role of Polymorphic Reuse Mechanisms in Schema Evolution in an Object-Oriented Database http://ftp.ccs.neu.edu/pub/research/demeter/documents/Dapers/LZHL94-polymorphic-reuse.ps, 1997; 18 pages.
Design and Implementation of ET++, a Seamless Object-Oriented Application Framework http://www.ubilab.org/publications/print_versions/pdf/wei89.pdf, 1989; 35 pages.
Altova, STYLEVISION 2004 User Manual, May 17, 2004, Altova, pp. 1, 2, 13-15, 27-30, 263, and 275-277.
Notice of Allowance mailed Sep. 22, 2008 in U.S. Appl. No. 11/021,099; 4 pages.
Non-Final Office Action mailed Jun. 11, 2008 in U.S. Appl. No. 11/021,099; 5 pages.
Response to Non-Final Office Action mailed Jun. 11, 2008 in U.S. Appl. No. 11/021,099, filed Jul. 9, 2008; 11 pages.
Non-Final Office Action mailed Jan. 17, 2007 in U.S. Appl. No. 11/021,099; 9 pages.
Response to Non-Final Office Action mailed Jan. 17, 2007 in U.S. Appl. No. 11/021,099, filed Jul. 17, 2007; 13 pages.
Final Office Action mailed Sep. 28, 2007 in U.S. Appl. No. 11/021,099; 9 pages.
Response to Final Office Action mailed Sep. 28, 2007 in U.S. Appl. No. 11/021,099, filed Mar. 21, 2008; 17 pages.

* cited by examiner

METHOD FOR AUTOMATICALLY ASSOCIATING DATA WITH A DOCUMENT BASED ON A PRESCRIBED TYPE OF THE DOCUMENT

FIELD OF THE INVENTION

The present invention relates to computer software and, more particularly, to electronic document management systems.

BACKGROUND OF THE INVENTION

Content or document management systems organize information in a systematic way so information can be stored, accessed, and distributed effectively. An effective document management system helps an organization to efficiently process, duplicate, distribute, and store documents. Traditionally, organizations have relied on paper or microfiche filing systems for storage and retrieval. Nowadays, more and more organizations are relying on paper-less filing systems, i.e., digital or electronic document management systems (hereinafter "electronic DMS"), to manage documents.

Compared to a paper or microfiche filing system, an electronic DMS reduces the cost in processing, duplicating, distributing, and storing documents; an electronic DMS also enables faster access to and retrieval of documents. In addition, an electronic DMS is capable of managing documents with various formats. A document in an electronic DMS can be any digitized content, such as a word processing file, an audio file, a video file, a spreadsheet, a fax, a database file, an e-mail, a scanned image, or an Internet/intranet HTML document.

Though an electronic DMS offers various economical and operational advantages over a paper or microfiche filing system, a conventional electronic DMS lacks certain desirable document management features. For example, a digital document usually is associated with a set of properties, such as file name, file size, or author of the document. Generally, the software creating a document predefines the properties associated with the document. This pre-setting of properties of an individual document does not allow a user to set properties for a group of documents sharing a common characteristic, for example, the same content type. A content type describes what a document is about. For instance, the content type of this document is patent application. Other examples of content types include project plan, personnel file, etc. A user such as the system administrator of an electronic DMS may wish to define properties and rules to manage documents sharing a common characteristic. For example, a system administrator may want to specify who can access personnel files in an organization. A conventional electronic DMS does not provide such a feature.

In addition, documents in an electronic DMS are generally stored in a document server. Conventionally, once a document is downloaded from the document server, the electronic DMS no longer has control over the behaviors of the document. For example, if a personnel file is downloaded from a document server, the electronic DMS no longer can enforce any access rule on the document.

Furthermore, a conventional electronic DMS allows all property information associated with a downloaded document to be modified and communicated back to a document server. However, in order to exert centralized management of documents sharing a common characteristic, a system administrator of an electronic DMS may prefer rules shared by the documents to remain constant. Hence, it is desirable that rules shared by a group of documents should remain intact in the document server without regard as to how the rules may have been changed in a downloaded document.

Therefore, there exists a need to centrally define properties and rules concerning documents sharing a common characteristic, such as the same content type. There also exists a need to automatically associate such properties and rules with such a document. There further exists a need to ensure that rules governing all documents sharing a common characteristic remain constant, not modifiable by specific settings on an individual document.

SUMMARY OF THE INVENTION

The invention addresses the above-identified needs by providing a computer-implemented method and a computing system that automatically associate properties and rules with documents sharing a common characteristic. Such a common characteristic can be the same content type, the same file extension, the same creator, etc. A common characteristic is also called a prescribed type.

One aspect of the invention defines a type template for each prescribed type. The type template includes generic type information that is automatically applied to all documents of the prescribed type. The type template may further include instance-specific type information that is instantiated for each document of the prescribed type. The type information included in a type template is associated with each document of the prescribed type.

Another aspect of the invention identifies the prescribed type associated with a document. The corresponding type information is then retrieved, for example, from a central document server. The retrieved type information is associated with the document, which may be opened by a client application that enforces rules contained in the type information. The type information may specify document management information such as workflow, access right, and business process.

In accordance with yet another aspect of the invention, associating type information with a document further includes creating a dependency between a document and its corresponding type template. A document is marked as dirty if its type template is updated. The type information is associated with the document only when the document is downloaded from the document server or requested by a client application.

In accordance with a further aspect of the invention, type information associated with a document may be retrieved from the document and sent back to the document server. Such type information includes the instance-specific type information, but not the generic type information that defines the behavior of all documents of the prescribed type.

In summary, the invention provides a computing system and a computer-implemented method that automatically associate type-specific information with a document of a prescribed type. The invention thus enables automatic management of the behaviors of documents sharing a common characteristic.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Embodiments of the invention define properties and rules for documents sharing at least one common characteristic, i.e., a prescribed type. One aspect of the invention provides a type template specifying type information that can be associated with each document of a prescribed type. Such a type template includes instance-specific type information, which is instantiated for each document of the prescribed type. For example, the instantiated instance-specific type information can identify the name and/or the size of a document. Upon the creation of a document of a prescribed type, instance-specific type information in the corresponding type template is instantiated for the document, and, preferably, stored in the directory on the document server where the document resides. The type template also includes generic type information that is automatically applied to all documents of the type. For example, the generic type information can dictate that only staff in the human resource department of an organization can access all documents of the content type "personnel data."

Once the document is requested by a client application and/or downloaded from the document server, the instantiated instance-specific type information in the directory and the generic type information in the type template are combined and associated with the document. The combined type information governs how the document behaves. The instantiated instance-specific type information in the document may be modified and sent back to the directory in the document server, while the generic type information in the document cannot be modified or updated on the document server.

The invention will primarily be described in the context of defining and using type information for documents of the same content type. However, those skilled in the relevant art and others will appreciate that the invention is also applicable to documents or information items of other prescribed types, such as the same file extension, the same creator, or the same creation date.

The following description first provides an overview of a computing system in which the invention may be implemented. Then a computer-implemented method is described. The computer-implemented method associates type information with a document when it is downloaded from a document server, and/or retrieves instantiated instance-specific type information from the document and stores the retrieved information on the document server. The illustrative examples provided herein are not intended to be exhaustive or to limit the invention to the precise forms disclosed. Similarly, any steps described herein may be interchangeable with other steps, or combinations of steps, in order to achieve the same result.

Figure 1:
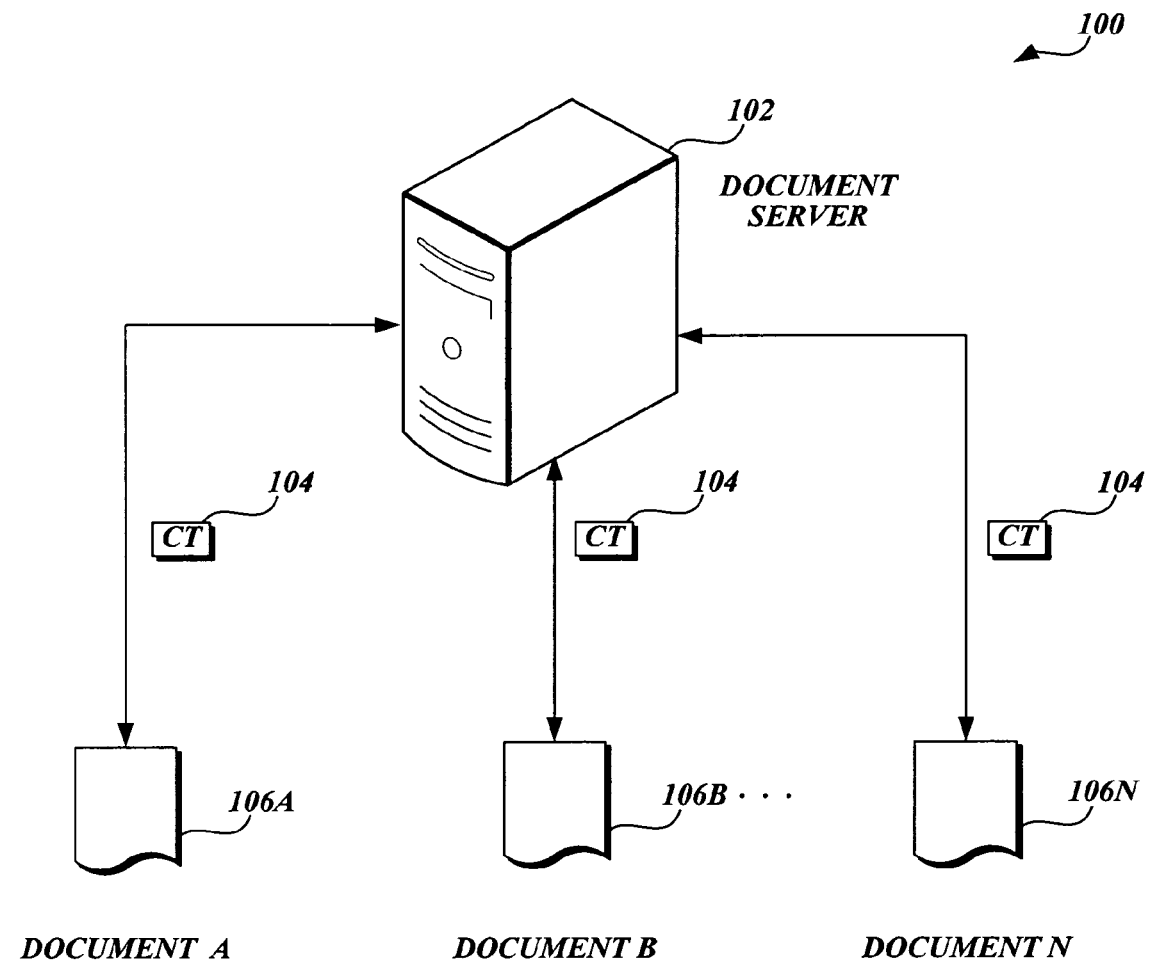
FIG. 1 is a block diagram illustrating an exemplary computing system for implementing the invention.

FIG. 1 is a block diagram illustrating an exemplary computing system 100 in which the invention may be implemented. A document server 102 stores all documents in their binary format. The document server 102 also includes content type information for documents of each predefined content type. A content type describes what a document is. For example, the content type for this document is patent application. Other examples of content types are project plan, personnel information, etc. The content type of a document can be specified by a user, or be determined by a template document or the location it is stored in the document server 102. The document server 102 contains the definition of each content type, i.e., a content type template. When a document is created and is specified to be a particular content type, the document server 102 will associate the corresponding content type information with the document so that the content type information can be enforced by any client application that opens the document. The content type information will remain with the document even if the document is removed from the document server 102.

The document server 102 associates a definition for a content type with any document of the content type. For example, as illustrated in FIG. 1, document A 106A, document B 106B, ..., document N 106N are of the same content type, and hence are associated with the same content type definition 104. As a result, a user can specify the behavior of documents of the same content type by specifying the content type definition at one central location, for example, the document server 102. The content type definition 104 is then associated with each document of the content type.

Figure 2:
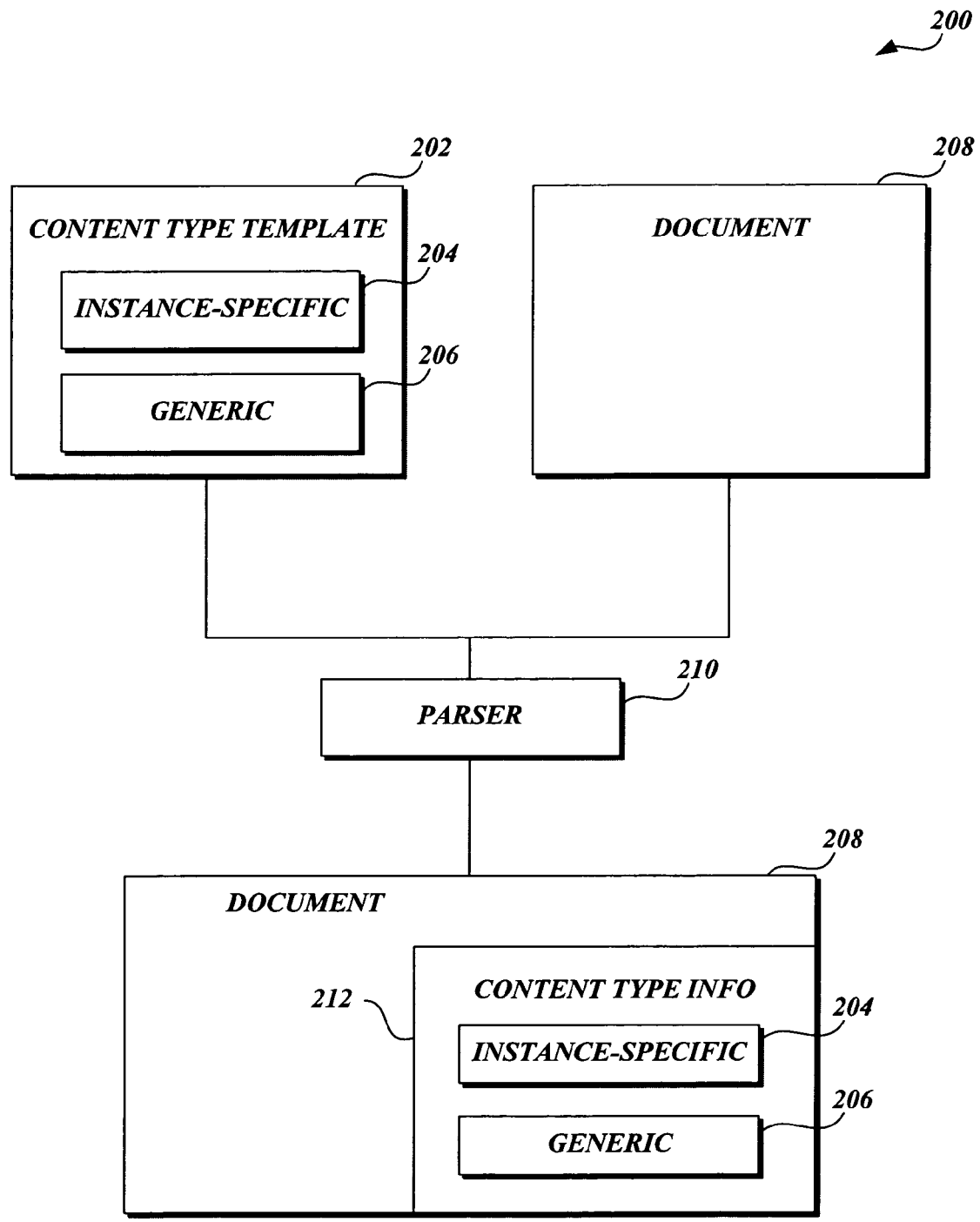
FIG. 2 is a block diagram illustrating one aspect of the invention, where content type information is associated with a document of a specific content type.

FIG. 2 illustrates one exemplary implementation 200 of the invention. In essence, the exemplary implementation 200 defines a content type template 202 for each content type. The exemplary implementation 200 then uses a parser 210 to associate the corresponding content type information 212 with a document 208 of the content type.

In embodiments of the invention, a content type template 202 is provided to define type-specific information for documents of a content type. The content type template 202 includes instance-specific type information 204 and generic type information 206. The instance-specific type information 204 includes properties of a document of the content type. For example, the instance-specific type information 204 may include properties identifying the name of a document, the file format of a document, the size of a document, etc. For a music document, the instance-specific type information 204 may also include properties such as sampling rate, length, etc. For a document containing URL bookmarks, the instance-specific type information 204 can further include properties such as last visit, Web site name, cookie information, etc. When a document 208 of the content type is created, the instance-specific type information 204 is instantiated with data specific to the document. The instantiated instance-specific type information 204 is then associated with the document, for example, by being stored in the same directory the document is stored in on the document server 102. An exemplary implementation of storing instance-specific type information of a document of a content type within the directory that stores the document is described in detail in a related U.S. patent application Ser. No. 11/058,096, filed Feb. 14, 2005 (now U.S. Pat. No. 7,653,653), titled "Dynamically Configurable Lists for Encoding Multiple Content Types," filed Jan. 7, 2005, which is incorporated herein by reference.

In exemplary embodiments of the invention, the content type template 202 further includes generic type information 206, which specifies type information that is automatically applied to all documents of the content type. The generic type information 206 may include policies regulating the behaviors of documents of the content type. For example, a writer may create a policy specifying that all documents containing a specific subject matter cannot be printed. A system administrator may define a retention policy specifying that documents of a specific content type will automatically be deleted after a certain time period. The generic type information 206 is defined on the document server 102.

In embodiments of the invention, the generic type information 206 is automatically applied to the documents of the content type by a client application that runs a document 208 of the content type. For example, a client application may automatically enforce any access restriction on personnel documents. The generic type information 206 can also be automatically applied to the documents of the content type by a server application, which may be on the document server 102. For example, if the generic type information 206 includes an expiration policy that specifies all documents of the content type will expire within ten years of creation, a process on the document server 102 may periodically scan all documents of the content type to enforce the expiration policy.

When a document 208 of the content type is requested by a client application or downloaded from the document server 102, content type information 212—the instantiated instance-specific type information 204 and the generic type information 206—is associated with the document 208. The content type template 202 thus enables all documents of the content type to share the same generic type information 206 and inherent same instance-specific type information 204.

In an exemplary embodiment of the invention, a parser 210 is used to associate content type information 212 with a document 208. The parser 210 can be used for any content type. In addition, the parser 210 is capable of recognizing the specific file format of a document 208 and associating content type information 212 with the document 208 according to the file format of the document 208. For example, the parser 210 may associate content type information 212 with a document 208 by inserting the information into a location in the document 208. This location may be different depending on the file format of the document. For instance, a word processing file would have a different insertion location than an image file.

Specifically, when a document 208 is requested by a client application or is downloaded from the document server 102, the parser 210 retrieves the corresponding content type information 212. The parser 210 then demotes the content type information 212 into the document 208. The resulting document 208 thus contains content type information 212 that includes both the instantiated instance-specific type information 204 and the generic type information 206.

For a large DMS, the document server 102 may contain hundreds or thousands of documents of each content type. Updating information in a content type template 202, for example, adding a new property or a new policy, means that all documents of the content type must be updated. If thousands of documents of the content type exist, updating the documents consumes extensive computing resources. Embodiments of the invention employ a lazy update mechanism to reduce the consumption of computing resources in the event documents need to be updated with changes in their corresponding content type template 202.

When a document 208 is determined to be of a content type, it is identified in a dependency list associated with the corresponding content type template 202. Any time the content type template 202 is updated, all documents of the content type can be determined from the dependency list. Any document that is dependent on the content type template 202 is then marked as dirty. The process of demoting the updated content type information 212 is delayed until the first time a document 208 is downloaded or requested by a client application. The lazy update mechanism thus prevents unnecessary rewriting of a document with updated content type information.

Figure 3:
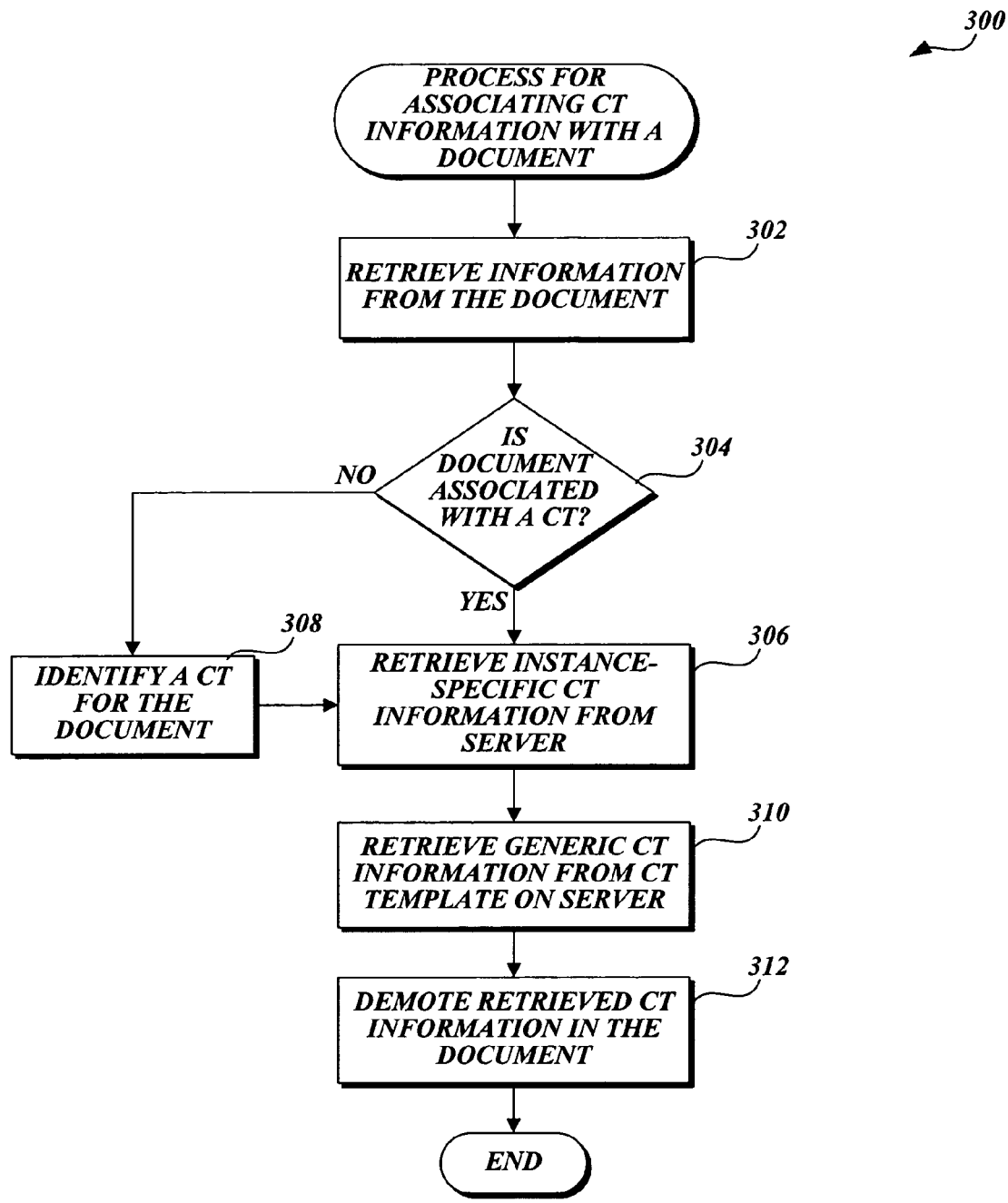
FIG. 3 is a flow diagram illustrating an exemplary process for demoting content type information into a document.

FIG. 3 is a flow diagram illustrating an exemplary process 300 for associating content type information with a document of the content type. The process 300 first retrieves information from the document. See block 302. If the document is associated with a specific content type, the information can include the name of the content type or a unique identifier that identifies the content type. The process 300 then proceeds to decide whether the document is associated with a specific content type. See decision block 304. If the answer is YES, the process 300 proceeds to block 306 to retrieve content type information from a document server such as the document server 102 illustrated in FIG. 1. If the answer is NO, the process 300 proceeds to identify a content type for the document. See block 308. In some embodiments of the invention, the process 300 may find a content type that most approximates the content in the document. For example, assuming the document contains a business plan, the document server contains no content type designated for a business plan, and the content type that comes closest to a business plan document is a project plan, the process 300 will associate the project plan content type with the document. In other embodiments of the invention, a default content type may be specified to be associated with a document that has no specific content type identified. Some embodiments of the invention may also allow a user to specify a content type for the document. After identifying a content type for the document, the process 300 then proceeds to block 306 to retrieve content type information for the document.

Specifically, the process 300 retrieves instantiated instance-specific type information from a directory on the document server. See block 306. The process 300 retrieves generic type information from the corresponding content type template on the document server. See block 310. The process 300 then demotes all the retrieved content type information to the document. See block 312. The process 300 then terminates.

Referring back to FIG. 3, in embodiments of the invention, the parser 210 also promotes instantiated instance-specific type information 204 from a document 208 and stores the information in the directory on the document server 102. The parser 210 does not promote any generic type information 206, which cannot be modified on an individual document. This ensures that generic type information 206 remains the same for all documents of the content type.

Figure 4:
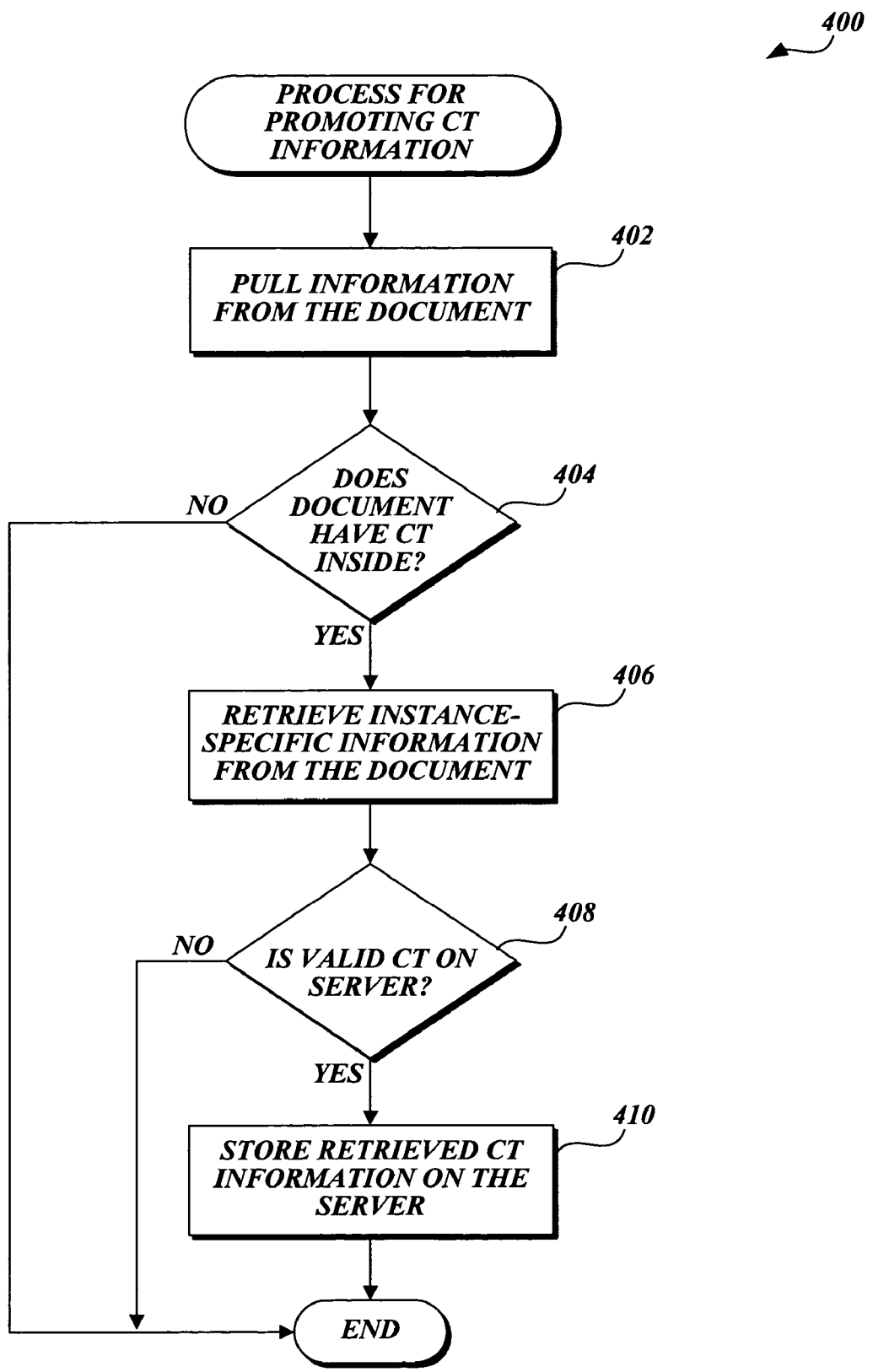
FIG. 4 is a flow diagram illustrating an exemplary process for promoting content type information from a document.

FIG. 4 is a flow diagram illustrating an exemplary process for promoting content type information from a document. The process 400 first retrieves information from a document. See block 402. Such information may include a name or unique identifier that identifies a content type associated with the document, if the document contains content type information. The process 400 then proceeds to determine whether the document contains any content type information. If the answer is NO, the process 400 terminates. See decision block 404. If the answer is YES, the process 400 retrieves instantiated instance-specific type information from the document. See block 406. As noted above, generic type information such as policies concerning all documents of a content type can only be demoted to, and not promoted from, a document. The process 400 then proceeds to determine if there is a matching and valid content type on a document server such as the document server 102 illustrated in FIG. 1. See decision block 408. If the answer is NO, the process 400 terminates. If the answer is YES, the process 400 proceeds to store the retrieved content type information on the document server, e.g., in the directory where the document resides. See block 410. The process 400 then exits.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for automatically associating data with a document, wherein the data is based on a prescribed type of the document, comprising:
   determining, at a document management system, that a first document is of a prescribed type, wherein the document management system comprises at least one document server having a processor, wherein the at least one document server stores a plurality of documents and the plurality of documents are of a plurality of document types;
   creating, by the processor, a dependency between a type template and the first document, wherein the type template defines content type information and wherein the content type information includes at least generic type information;
   retrieving the type template for the prescribed type;
   retrieving instance-specific information for the first document;
   retrieving the generic type information for the prescribed type from the type template, wherein the generic type information includes policies applicable to all of the plurality of documents that are of the prescribed type;
   associating the instance-specific information and the generic type information with the first document;
   receiving a change to the content type information of the type template;
   in response to receiving the change to the content type information of the type template, marking the first document as dirty;
   after receiving the change to the content type information, receiving a request for the first document; and
   only in response to receiving the request for the first document associating the changed content type information with the first document.

2. The computer-implemented method of claim 1, wherein the type template is instantiated for each document of the prescribed type.

3. The computer-implemented method of claim 2, wherein the generic type information includes retention, expiration or print policy information.

4. The computer-implemented method of claim 3, wherein the type template further includes the instance-specific information that is instantiated for the first document.

5. The computer-implemented method of claim 4, further comprising retrieving and storing instantiated instance-specific type information from the first document.

6. The computer-implemented method of claim 1, wherein type information includes document management information selected from a group consisting of workflow, access right, and business process.

7. A computer-implemented method for automatically associating data with a document, wherein the data is based on a prescribed type of the document, comprising:
   identifying, at a document management system, a prescribed type of a first document, wherein the document management system comprises at least one document server having a processor, wherein the at least one document server stores a plurality of documents and the plurality of documents are of a plurality of document types;
   creating, by the processor, a dependency between a type template and the first document, wherein the type template defines content type information and wherein the content type information includes at least generic type information;
   retrieving the type template for the prescribed type;
   retrieving the generic type information of the prescribed type from the type template, wherein the generic type information includes rules applicable to documents in the plurality of documents that are of the prescribed type;
   associating the generic type information with the first document;
   receiving a change to the content type information;
   in response to receiving the change to the content type information, marking the first document as dirty;
   after receiving the change to the content type information, receiving a request for the first document; and
   only in response to receiving the request for the first document, associating the changed content type information with the first document.

8. The computer-implemented method of claim 7, wherein the type template is instantiated for each document of the prescribed type.

9. The computer-implemented method of claim 8, wherein the generic type information includes retention, expiration or print policy information.

10. The computer-implemented method of claim 9, wherein the type template further includes instance-specific type information that is instantiated for each document of the prescribed type.

11. The computer-implemented method of claim 10, further comprising retrieving and storing instantiated instance-specific type information from the first document.

12. The computer-implemented method of claim 7, wherein type information includes document management information selected from a group consisting of workflow, access right, and business process.

13. A system for automatically associating data with a document, wherein the data is based on a prescribed type of the document, comprising:
   at least one processor;
   memory, operatively connected to the at least one processor and containing instructions that, when executed by the at least one processor, cause the at least one processor to perform a method comprising:
      determining, at a document management system, that a first document is of a prescribed type, wherein the document management system comprises at least one document server, wherein the at least one document server stores a plurality of documents and the plurality of documents are of a plurality of document types;
      creating a dependency between a type template and the first document, wherein the type template defines content type information and wherein the content type information includes at least generic type information;
      retrieving the type template for the prescribed type;
      retrieving instance-specific information for the first document;
      retrieving the generic type information for the prescribed type from the type template, wherein the generic type information includes policies applicable to all of the plurality of documents that are of the prescribed type;

associating the instance-specific information and the generic type information with the first document;

receiving a change to the content type information of the type template;

in response to receiving the change to the content type information of the type template, marking the first document as dirty;

after receiving the change to the content type information, receiving a request for the first document; and only in response to receiving the request for the first document, associating the changed content type information with the first document.

14. The system of claim 13, wherein the type template is instantiated for each document of the prescribed type.

15. The system of claim 14, wherein the generic type information includes retention, expiration or print policy information.

16. The system of claim 15, wherein the type template further includes the instance-specific information that is instantiated for the first document.

17. The system of claim 16, further comprising retrieving and storing instantiated instance-specific type information from the first document.

18. The system of claim 13, wherein type information includes document management information selected from a group consisting of workflow, access right, and business process.

* * * * *